US007320348B2

(12) United States Patent
Murcia

(10) Patent No.: US 7,320,348 B2
(45) Date of Patent: Jan. 22, 2008

(54) FOREST REJUVENATION AND PRESERVATION

(75) Inventor: Philippe R. Murcia, White Plains, NY (US)

(73) Assignee: ECOEM, LLC, Greenwich, CT (US)

( * ) Notice: Subject to any disclaimer, the term of this patent is extended or adjusted under 35 U.S.C. 154(b) by 761 days.

(21) Appl. No.: 10/423,645

(22) Filed: Apr. 25, 2003

(65) Prior Publication Data

US 2003/0201349 A1    Oct. 30, 2003

Related U.S. Application Data

(60) Provisional application No. 60/376,294, filed on Apr. 26, 2002.

(51) Int. Cl.
*A01G 23/02* (2006.01)
(52) U.S. Cl. ........................................ 144/335; 144/4.1
(58) Field of Classification Search ................. 144/4.1, 144/34.1, 335, 336; 56/14.7, 14.8, 16.7–17.6
See application file for complete search history.

(56) References Cited

U.S. PATENT DOCUMENTS

| | | | | |
|---|---|---|---|---|
| 2,228,616 A | * | 1/1941 | Thomsen ..................... 60/618 |
| 3,651,845 A | * | 3/1972 | Propst ......................... 144/4.1 |
| 3,822,651 A | * | 7/1974 | Harris et al. ................. 110/234 |
| 4,214,616 A | * | 7/1980 | Brisson .................... 144/24.13 |
| 4,348,211 A | * | 9/1982 | Zimmerman .................... 48/76 |
| 5,074,992 A | * | 12/1991 | Clinton ........................ 209/19 |
| RE33,840 E | * | 3/1992 | Peterson et al. ......... 144/208.7 |
| 5,419,502 A | * | 5/1995 | Morey ................. 241/101.761 |
| 6,182,725 B1 | * | 2/2001 | Sorvik .......................... 144/335 |
| 6,341,632 B1 | * | 1/2002 | Sorvik .......................... 144/335 |
| 6,536,215 B1 | * | 3/2003 | Vikstrom ................... 60/641.1 |

* cited by examiner

*Primary Examiner*—Shelley M. Self
(74) *Attorney, Agent, or Firm*—Hess Patent Law Firm, PC; Robert J. Hess

(57) ABSTRACT

A method of rejuvenating and preserving a forest by transforming wood waste. Tree species are identified in a forest area. Equipment is then selected or modified based on the identified tree species. Wood waste of the identified tree species is gathered and transformed into useful wood derived end products with the selected or modified equipment. The wood waste may be transformed into wood charcoal and used as a fuel in a furnace to heat a boiler to produce steam. The steam is used to drive a turbine that runs an electric generator to produce electricity to run equipment that transforms the wood waste.

22 Claims, 5 Drawing Sheets

FOREST REJUVENATION AND PRESERVATION

CROSS-REFERENCE TO CO-PENDING PATENT APPLICATIONS

Priority is claimed from provisional application Ser. No. 60/376,294, filed Apr. 26, 2002.

BACKGROUND OF THE INVENTION

1. Field of the Invention

The present invention relates to treating forest regions based on their condition by rejuvenating sickly forest regions and preserving healthy forest regions while transforming the waste wood from the forest regions into a fuel source and into finished wood products. The fuel source may be used to power tools and equipment used to process the wood waste.

2. Discussion of Related Art

For the Western economies, recycling became one of their concerns when the "Green parties" started to be politically involved and no longer considered lyrical and folkloric. The first major warning on our economic and industrial behavior occurred in 1992 at an international summit that took place in Rio de Janeiro (Brazil). The Rio de Janeiro conference was the first to address the fact that:

a) the hole in the ozone layer has enlarged year after year;
b) more and more trees were dying from acid rains;
c) more and more forestry were burning in an unusual way;
d) more and more human diseases were related to atmospheric pollution.

The Rio de Janeiro conference, as with others, ended up by stating pious vows and nothing else.

At the Kyoto conference in 1997, these concerns were more accurately addressed and some recommendations were made but without obligation or sanctions being set down. Since the Kyoto conference the international scientific community has published study after study and article after articles about these concerns.

Scientists continue to gather more explicit and convincing evidence to link scientifically these catastrophic events to industrial or/and human behaviors. Many wooden based products can be made out of the wood currently left over after logging has occurred and from the natural cycle of forest destruction. Such undertaking can save one tree out of three from being cut down, which is desirable since a shortage of timber in general and tropical species in particular may occur in the near future.

By transforming such left over, the bio-mass in the forest reduces, and by doing so, the forest recovers its main role as a "sink" for carbon dioxide and not a purveyor of carbon dioxide. The line of products made from the transformed leftover products is less expensive than the same line of products made from newly cut timber. As with the fishing industry in the middle of the 20th century, there is no need to bring the ocean to the inland factory; it is easier to bring the factory to the ocean. By bringing the equipment or factory to the natural resource, the finished products can go through the chain of consumption avoiding many steps, including loading and unloading the goods, thereby saving and increasing the potential profit margins.

Although forests are on land and schools of fish are in the oceans, both the logging and fishing industries face the same obstacles in that the raw material (trees, fish) they require is found in remote areas, away from existing power generation facilities. It would therefore be desirable to establish a power generation facility at the remote area that draws upon raw materials available locally to generate power.

Forests in each of the continents vary from each other with respect to the types of tree species that are indigenous to particular forest regions. Each tree species has different characteristics that distinguish it from other types of species, such as the hardness of the wood and the concentration of sap. Therefore, the equipment and tools used for cutting the tree may vary depending upon the tree species. Likewise, the present inventor has found that the conditions in a kiln under which wood may be transformed into wood charcoal varies in dependence upon the tree species from which the wood was taken.

The present inventor has disclosed that waste wood may be transformed into wood charcoal, tar, powder, chopsticks, toothpicks, compost, organic fertilizer, decorative mulch, paper, and europalettes. It would be desirable to effect such transformation where the waste wood is found, thereby reducing, if not eliminating, the cost for transporting the wood waste to production facilities.

SUMMARY OF THE INVENTION

One aspect of the invention resides in identifying tree species in a forest area. Based on this identified information, suitable tools and equipment are selected and used to cut wood waste of the identified tree species. This wood waste includes naturally fallen timber and remnants of timber after logs are extracted during logging operations. The wood waste is transformed into useful end products, including a fuel source. A source of energy is converted into steam or electricity—the source of energy is either the fuel source or a non-fossil fuel energy source (solar, wind, geothermal or hydro). At least some of the tools and equipment that are used to either cut the wood waste or transform the wood waste are powered by this steam or electricity. A platform containing wood finishing tools and equipment may be powered by this steam or electricity.

BRIEF DESCRIPTION OF THE DRAWING

For a better understanding of the present invention, reference is made to the following description and accompanying drawings, while the scope of the invention is set forth in the appended claims:

DETAILED DESCRIPTION OF THE INVENTION

Figure 1:
FIG. 1 is a photograph showing a healthy forest region.

Turning to the drawings of FIGS. 1-6, the approach of the present invention is to address environmental needs, production needs and energy needs for treating forest regions. To assess these needs, surveys are first conducted of forest regions to determine the state of the forest condition and the availability of various tree species. Based on the results of such surveys, regions of the forest that are healthy (see FIG. 1) and regions of the forest that are sickly (see FIG. 2) can be identified. Based on such identification, efforts can be made to rejuvenate the tree species of sickly regions of the forest and to preserve the tree species of healthy regions of the forest. If repeated over time, such surveys may provide clues as to why certain regions of the forest became sickly while others did not or rejuvenated. Such clues should prove helpful in assessing what are the conditions of the forest that trigger either a decline of particular tree species or a rejuvenation of particular tree species.

Waste wood, which arises from the natural destruction of the forest or from leftover remnants of logging operations, plays a role in the condition of forest regions. Such waste wood stunts the growth of new tree species where the waste wood lies and forms a breeding ground for harmful insects and fungi that may be detrimental to the health of forest regions. Generally, the removal of excessive wood waste is beneficial to the health of a forest. The surveys should also provide indications as to those forest regions where the presence of wood waste is more excessive than in other forest regions.

To address the treatment of the forest, the present inventor proposes that efforts be made to rejuvenate tree species in sickly regions and to preserve tree species in healthy regions. For instance, the surveys may provide clues as to the extent to which a particular density of tree species in particular forest regions that can be sustained over time in those particular regions. If the current tree species density exceeds what can be sustained over time, then the density should be reduced to help preserve the health of those particular regions. Thus, logging operations may commence in those particular regions. If the current tree species falls short of what can be sustained over time because of an identified problem in that forest region, then additional tree species may be planted and measures can be taken to try to eliminate the identified problem such as waste wood removal. No logging operations should be carried out in the sickly regions until the tree density for particular tree species has reached acceptable levels.

The replanting of tree species should be done with care to preserve the balance of the tree species of the forest. While governmental policies that require loggers to replant tree species in forest regions where logging operations have been performed is laudatory, such policies may provide detrimental effects to the condition of the forest if those tree plantings upset the balance of tree species in those forest regions. It is virtually impossible to ascertain what that balance is without surveys and monitoring.

If the responsibility for choosing the tree species to replant is left to the logging company, the logging company may be inclined to plant tree species that suit its criteria for commercialization, i.e., trees that mature quickly and provide a significant quantity of quality lumber when they mature. When such trees mature years later, however, such tree species may adversely affect the density of the surrounding native species and create long term environmental damage to the health of the forest. Indeed, even planting the same native tree species may be detrimental to the health of the forest region if the density of the tree species in that forest region is already at the maximum density level that the forest region can sustain to ensure that the forest region remains healthy.

The approach of using forest surveys of tree species and waste wood as a basis for determining the proper treatment of forest regions and then monitoring the results of the treatment is prudent and responsible. Such an approach minimizes the risk of environmental damage and furthers the preservation and rejuvenation of suitable habitats for wildlife in the area as well as tree species.

Figure 3:
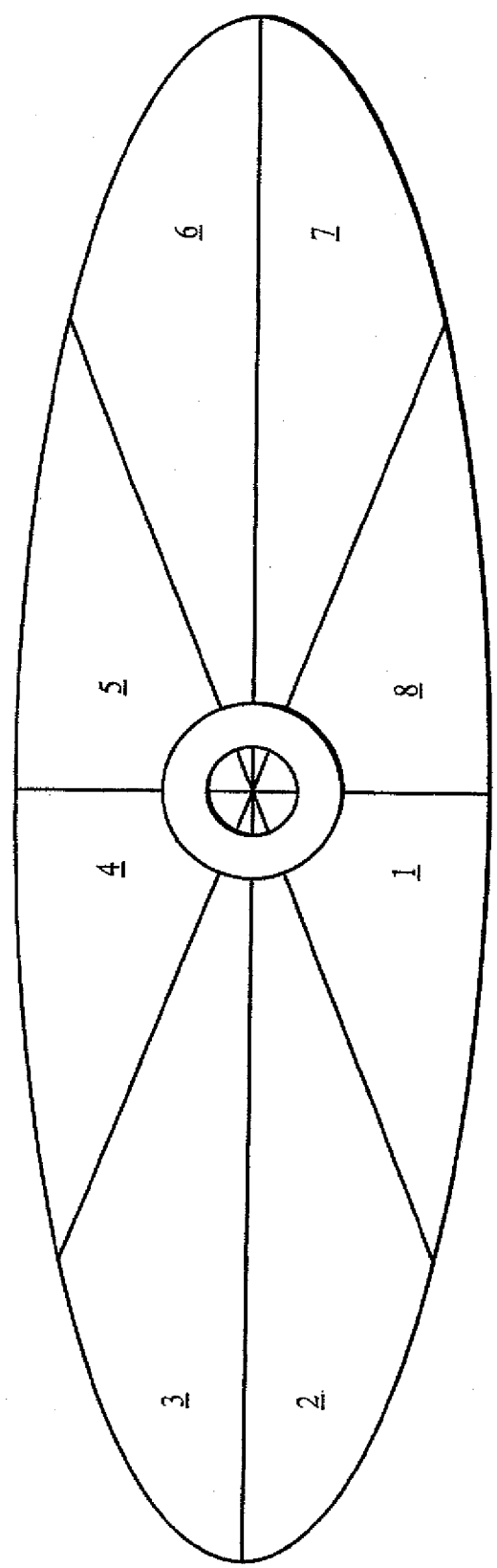
FIG. 3 is a schematic representation of a forest divided into regions or sectors in accordance with the invention.
Figure 4:
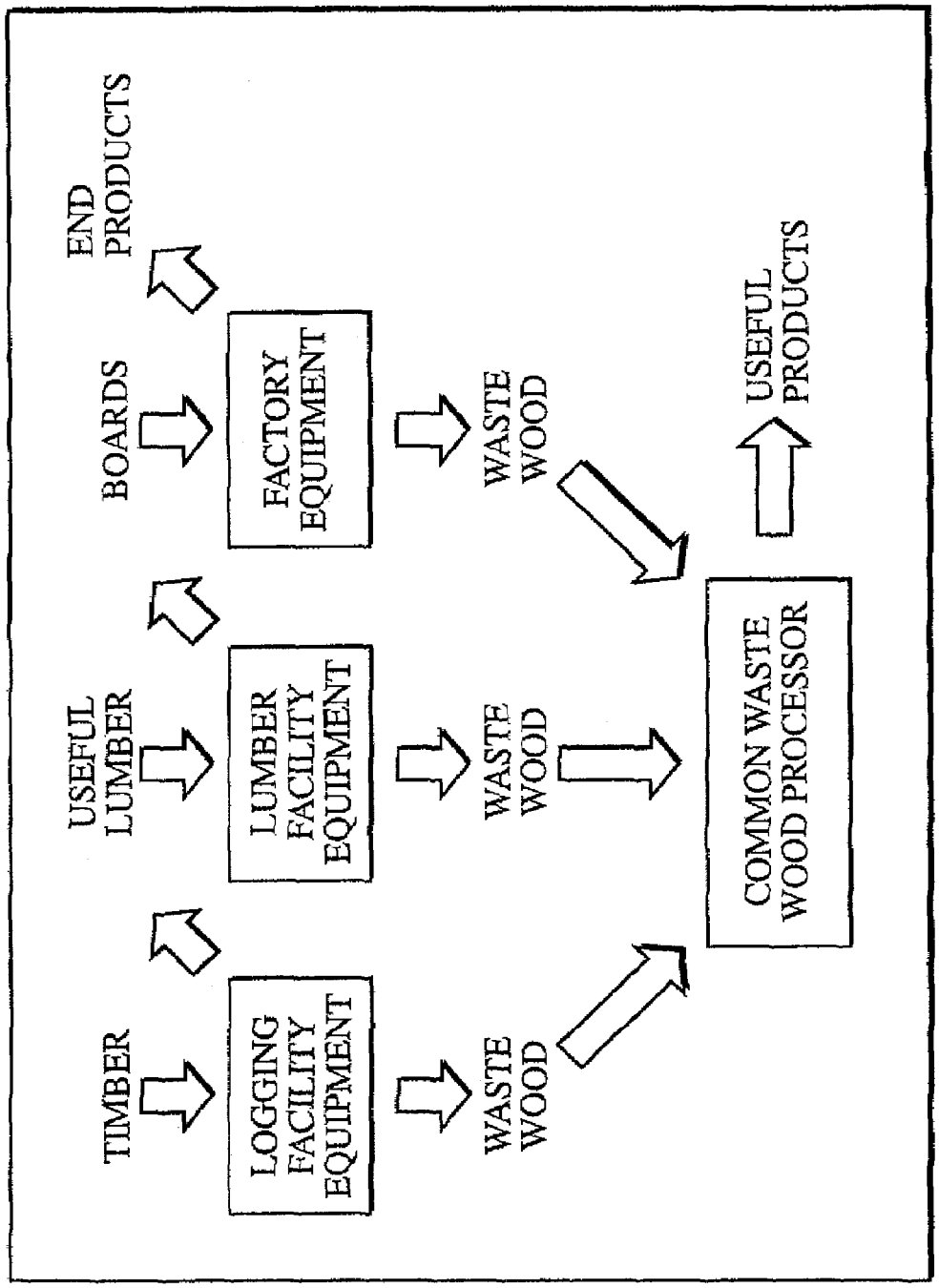
FIG. 4 is a schematic diagram of a platform to be located at a center area of FIG. 3 in accordance with the invention.

One technique for the proper treatment of forest regions is shown in FIG. 3. FIG. 3 shows a representation of a forest area within a circular area, say with a diameter of two kilometers. The circular area represents the forest regions surveyed and the circular area is divided into eight parcels or different forest regions whose areas are more or less equal. The boundaries of such parcels may be determined based on a precise survey may by forestry engineers or other such skilled persons. Each parcel may represent a different volume of merchantable wood cut or to be cut.

That is, the survey would reveal the number of species present in each parcel based on satellite photographs, airplane photographs and onsite surveying. The survey also would reveal the approximate number of trees that can be cut for each species present. Further, the survey may reveal the approximate tonnage of residual trees that will result from cutting down trees or from natural destruction or that piled up over time. The prevalence of certain tree species and/or an indication of healthy or unhealthy forest conditions would also become known.

Different regions of the same forest at any given time may be fairing better than that of others so it is not enough for a surveyor to sample a small portion of the forest and draw conclusions as to the condition of the entire forest from that small sample. For instance, if a forest has mountains or hills, regions of the forest that are on the sunny side may be fairing better than those on the shady side or the mountains of hills. Further, disease may be present in one tree species found in some regions of the forest that may adversely affect those regions, while other regions that do not have that same tree species may fair better.

Figure 2:
FIG. 2 is a photograph showing a sickly forest region.

The photograph of FIG. 1 shows a healthy region of a forest. The tree species are abundant and the branches are full. On the other hand, the photograph of FIG. 2 shows a sickly region of the same forest in which disease or insufficient nutrients/water has rendered the tree species unhealthy with branches bare.

With information from the survey provided for the parcels of FIG. 3, the capacity of production for each tree species may be predicted and the energy needs required for meeting that capacity may be determined. Appropriate equipment suited for use with particular tree species may be selected or modified to optimize processing.

Suitable parcels will be subject to two activities. The first is cutting down trees and the second is transforming residual wood waste into useful end products. To carry out these activities, a platform is placed at the center of the circle of FIG. 3 that contains suitable wood processing equipment for a particular forest sector undergoing waste wood processing. By removing wood waste from the forest floor and from leftover remnants of logging operations, healthy forest regions can be kept healthy and sickly forest regions can be rejuvenated.

The equipment of the platform can be modified or selected to suit the wood waste of the particular type of tree species of the forest region whose waste wood is being processed. The platform 20 in accordance with the invention is exemplified in FIG. 4 and is to be located at the common center of the forest regions of FIG. 3. The platform 20 includes steam generation, electricity generation, and waste wood transformation.

One waste wood transformation technique is to transform the wood waste into wood charcoal and another is to cut and shape the wood waste into useful end products. Since different types of tree species differ with respect to their hardness and sap content, knowing in advance what tree species are available in the parcels will help in determine the measures needed to transform the wood waste. For instance, tree species with harder woods will be more difficult to cut than is the case for softer woods to sharper cutting tools may be used and longer cutting times may be expected. Due to differences in the sap content of different tree species and other factors, the amount of time needed to transform the wood waste into wood charcoal may vary.

Sources of steam generation can arise from converting water into steam with heat given off from the burning of a fuel source, which is derived from the wood waste during the transformation of the wood waste into wood charcoal. and from waste heat, which may be recovered during the wood charcoal transformation process. One source of electricity generation may come from converting the steam into electricity by using a conventional turbine generator or electro turbine 30. Other sources of electricity may come from batteries or non-fossil fuel derived electricity generation from wind, solar, hydro, geothermal, etc.

A boiler with a furnace may be used to generate steam to send to the electro turbine 30. The furnace generates the necessary heat to covert water in the boiler into steam by burning a fuel source derived from the process of transforming wood waste into wood charcoal. Such a fuel source may be the wood charcoal or a combustible ingredient of the wood waste that is given off during the transformation of the wood waste into wood charcoal, such as methane. The transformation of the wood waste into wood charcoal takes place within a kiln or a closed reactor vessel.

The heat is provided either from electrical resistors that are powered by the electricity generation or from igniting the waste wood in a kiln and controlling the carbonization process. The kiln and reactor and their use in transforming wood waste into wood charcoal is described in detail in co-pending patent applications belonging to the present inventor. That is, pending patent application Ser. No. 10/058, 677 discloses a kiln for producing wood charcoal, whose contents are incorporated herein by reference, and pending patent application Ser. No. 10/082,475 discloses a reactor for producing wood charcoal, whose contents are incorporated herein by reference.

The steam from heating water recovery sections of kilns and reactors 40 is conveyed via steam pipes 42 to the electro turbine 30. The electro turbine 30, in turn, generates electricity for powering processing equipment for cut trees, such as a water compressor 50, a grinding machine 52 and a stump defragmenter 54. The water compressor 50 may have a hose or water pipe 56 to convey a mixture of pressurized water and abrasive materials (such as sand or metal fragments) to a cutting belt 58. The cutting belt 58 is wrapped around a tree to be toppled by cutting about the girth of the tree (tree girdling) after forming an angled undercut in the tree cut with a chain-saw or other cutting tool above where the tree girdling takes place.

The electro turbine 30 also generates electricity for powering equipment for shaping the cut trees into lumber. Such shaping equipment includes a conventional, portable edge saw 60 for making boards. Further, the electro turbine 30 may also generate sufficient electricity for powering finishing equipment for transforming the lumber or boards into finished wood products. Such finishing equipment includes circular saws 62, ribbon saws 64, planers 66, shapers 68, mortisers 70 and routers 72. Further, the electro turbine 30 may generate sufficient electricity to run a crane 74 that may be used to move the finishing equipment about as desired. To improve energy efficiency and better automate the finishing process, all the finishing equipment may be operated in response to direction from a common controller (not shown). The controller may be programmed accordingly to optimize energy efficiency, minimize waiting time in conveying the wood between pieces of finishing equipment.

For instance, if the wood is held up for the longest time at the shaper 68, additional shapers 68 may be included in the platform to avoid delays in manufacturing a finished wood product. All the shaping and finishing equipment may be conventional, except that the cutting belt 58 and reactors 40, which are described in copending patent applications. The reactors 40 may have a heat exchanger about its heating elements to capture waste heat. Such heat exchanger is fed water through water pipes 76 as needed as water passing through the heat exchange is converted into steam and conveyed to the electro turbine 30.

Any waste wood leftover from any of the shaping and finishing operations may be retrieved for use in the reactors 40. Additional processing equipment may be used, such as a pneumatic hammer, hand held sewing machines and charcoal containers for packaging and routing the end Indeed, any organic matter, whether underbrush, grasses, other plants, or even household garbage may be used in the reactors 40 to generate charcoal.

Figure 5:
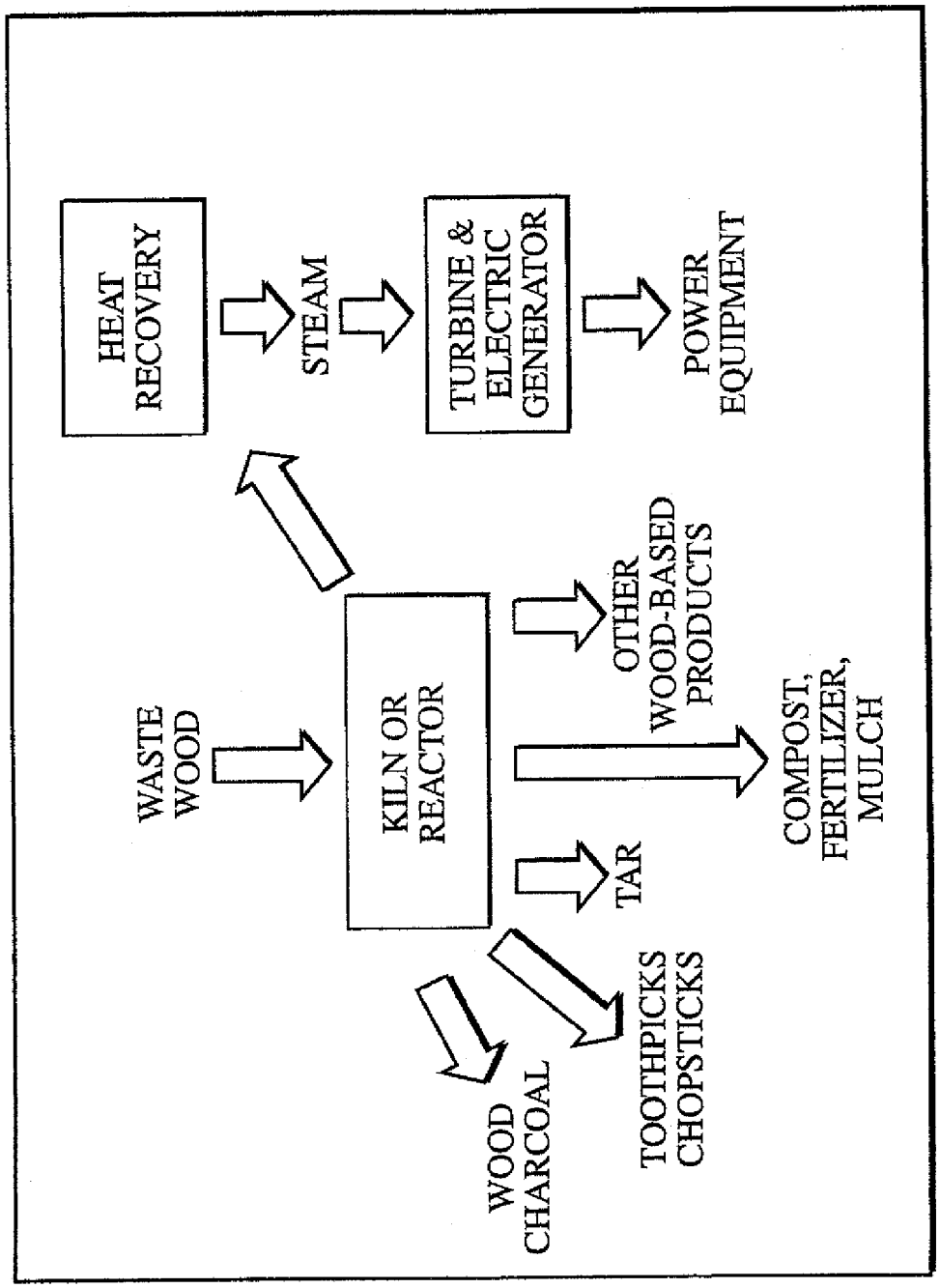
FIG. 5 is a flow diagram showing the path of timber and wood processing in accordance with the invention.

FIG. 5 shows the path of timber and wood processing. Conventional equipment is used for logging, lumber processing and end wood derived product processing. Less equipment is needed than conventional techniques, because of the use of the platform to create finished end products instead of logs to transport to remote mills.

Timber is cut and brought to a sawmill and other such equipment to convert the timber into logs. Any remnant leftover, such as branches and other waste wood, is either discarded or put into a furnace or heater.

The logs are then transported to a facility that can transform with conventional equipment the logs into lumber, such as boards and planks. Any leftover wood cuttings from the logs is discarded or burned. The lumber is now ready to be shipped for end uses and may wind up at a factory that uses the lumber for making wood derived end products too numerous to mention here. Some examples include furniture, home furnishings, building construction materials, boats, etc. Again, any leftover wood scrap is discarded and thrown out.

Each of these operations is inefficient or wasteful with respect to how waste wood is handled. The amount of wood scrap or wood waste, when considered in total, represent and significant amount. If burned, the wood scrap or wood waste releases pollution into the atmosphere. If discarded, exposure to the sun releases carbon dioxide into the atmosphere, adding to the green house effect. If thrown out, the bulk wood fills up valuable space at landfills.

As can be seen in FIG. 5, a solution to these problems is to send the waste wood from at least two, if not all, of these operations to a common waste wood processing facility or platform that can transform the wood waste into useful products. By locating each of the facilities near each other, substantial savings are realized in transportation costs and delays in the arrival of needed wood is significantly shortened.

Figure 6:
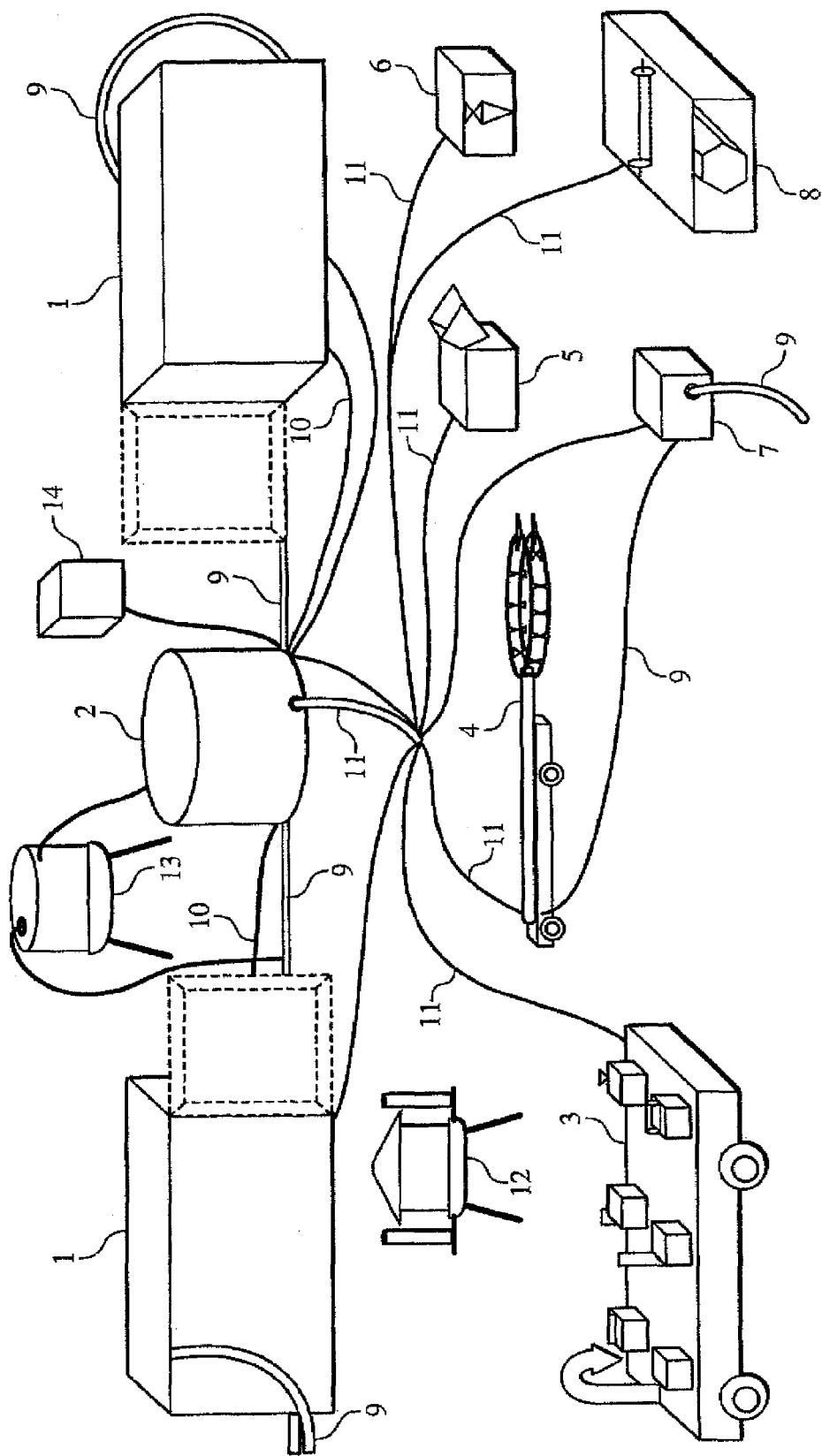
FIG. 6 is a flow diagram showing the path of waste wood processing through a portable platform in accordance with the invention.

As seen in FIG. 6, the waste wood processing facility or platform preferably has a kiln or reactor that transforms the wood waste into wood charcoal, which is highly purified since harmful constituents of the wood is released during the transformation process and collected. One of the byproducts, for instance, is tar which itself is of commercial value. The platform may have other types of equipment for making other types of products from the waste wood, such as chopsticks, toothpicks, mulch, compost, fertilizer, europalettes, etc. Thus, the more valuable commercial logs are saved for other purposes.

The present inventor and a further patent application pending directed to a container for holding wood charcoal, namely, U.S. Ser. No. 09/820,583, whose contents are incorporated herein by reference. As taught in that disclosure, additional economic efficiencies are realized where the container itself is made of wood and the facility for making the container is near is source of wood supply. The container may be made from wood remnants.

The electrical energy need not be supplied solely by the electro turbine 30 that is supplied with steam, but may be supplemented by electrical energy produced from a solar energy converter, a wind energy converter, a geothermal energy converter, a hydro-energy converter, and any combination thereof.

To better optimize the use of furnaces and reactors 40, the electricity demand for running the reactors 40, the platform and wood cutting equipment may be determined or monitored. As the electricity demand grows, more furnaces or reactors 40 may be activated to generate heat for converting water into steam to supply to the electro turbine 30. As the electricity demand drops, furnaces or reactors 40 may be deactivated as appropriate. The monitoring may be done with conventional sensors of electricity demand and controllers that interpret the signals from the sensors to send instructions for regulating the amount of steam needed to be supplied to the electro turbine 30 to satisfy the demand.

Staggering the activation of reactors 40 at different time intervals is advantageous. Such staggering avoids spikes in the electricity demand since the amount of heat needed to maintain the reactors 40 at various temperature levels during various cycles for transforming wood charcoal varies over time. Further, the work force needed to optimize the loading and unloading of the reactors 40 can be kept to a minimum since only staggered ones of the reactors 40 will need to be made ready for the next cycle at any one time. Indeed, the kilns or other sources of energy that are used to either supply steam to the electro turbine 30 or generate electricity directly may be shut down for periods of time. For instance, after initial start-up, the electro turbine 30 may have an ample supply of electricity to satisfy the needs of all the electrical resistors of the reactors 40 and the platform and other equipment. The reactors 40 may be equipped with heat exchangers to convert water into steam for supply to the electro turbine 30. Therefore, the supply of the electricity supplied by the electro generator 30 to satisfy the needs of the electrical resistors is to some extent offset by the steam supplied through heat exchange from heat given off by the electrical resistors.

While the foregoing description and drawings represent the preferred embodiments of the present invention, it will be understood that various changes and modifications may be made without departing from the spirit and scope of the present invention.

What is claimed is:

1. A method of forest rejuvenation and preservation, comprising the steps of: identifying tree species in a forest area; selecting tools and equipment that are compatible for use with the identified tree species based on the identifying; transporting the selected tools and equipment and a platform to the forest area; and powering the selected tools and equipment with the platform to transform the identified tree species into a fuel source; converting a source of energy into steam or electricity, the source of energy being selected from a group consisting of the fuel source and a non-fossil fuel energy source; and powering at least some of the selected tools and equipment with the steam or electricity that was converted from the source of energy.

2. A method as in claim 1, wherein the identifying includes identifying the tree species with ground viewing equipment of an airborne vehicle.

3. A method as in claim 1, further comprising evaluating the identified tree species at a site remote from the forest area and undertaking the selecting and transporting as a result of the evaluating.

4. A method as in claim 1, further comprising: gathering wood waste from the identified tree species, the wood waste being selected from a group consisting of timber that is naturally fallen and leftover remnants after extraction of logs from the timber during logging operations; cutting the gathered wood waste of the identified tree species; transforming the cut and gathered wood waste into useful end products, which include the fuel source; performing the cutting and transforming with the selected tools and equipment.

5. A method as in claim 4, wherein the transforming includes producing the leftover remnants while cutting logs from the timber of the identified tree species and while cutting boards from the logs, the gathering including gathering the leftover remnants.

6. A method as in claim 4, wherein the transforming includes transforming at least some of the wood waste into the fuel source selected from a group consisting of wood charcoal, methane and combustible materials extractable from the wood waste.

7. A method as in claim 4, wherein the transforming includes extracting tar as the wood derived useful end product.

8. A method as in claim 4, wherein the transforming includes forming powder as the useful end products.

9. A method as in claim 4, further comprising: defragmenting stumps of the identified tree species; grinding portions of the identified tree species, the steps of defragmenting and grinding being carried out with further tools and equipment, and using the steam or electricity to run at least one of the further tools and equipment.

10. A method as in claim 4, further comprising powering with the steam or electricity a platform that supports tools and equipment configured to transform the identified timber into finished wood products.

11. A method as in claim 4, further comprising powering a compressor with the steam or electricity and producing pressurized water from a source of water with the compressor, adding abrasive particles to the pressurized water, conveying the pressurized water with abrasive particles to a site in a manner to effect cutting of the identified timber.

12. An apparatus to rejuvenate and preserve forests, comprising: means for identifying tree species in a forest area; means for transporting selected tools and equipment and a platform to the forest area, the selected tools and equipment being configured to be compatible for use with the identified tree species; and means for powering the selected tools and equipment with the platform to transform the identified tree species into a fuel source; means for converting a source of energy into steam or electricity, the source of energy being selected from a group consisting of the fuel source and a non-fossil fuel energy source; and means for powering at least some of the selected tools and equipment with the steam or electricity that was converted from the source of energy.

13. An apparatus as in claim 12, wherein the means for identifying includes an airborne vehicle that has ground viewing equipment to identify the tree species.

14. An apparatus as in claim 12, further comprising evaluating means for evaluating the identified tree species, the evaluating means being at a site that is remote from the forest area, the selected tools and equipment being selected based on the evaluating means.

15. An apparatus as in claim 12, further comprising: means for gathering wood waste from the identified tree species, the wood waste being selected from a group consisting of timber that is naturally fallen and leftover remnants after extraction of logs from the timber during logging operations; means for cutting the gathered wood waste of the identified tree species; means for transforming the cut and gathered wood waste into useful end products, which include the fuel source; and means for performing the cutting and transforming with the selected tools and equipment.

16. An apparatus as in claim 12, further comprising means for producing the leftover remnants while cutting logs from the timber of the identified tree species and while cutting boards from the logs, the means for gathering including means for gathering the leftover remnants.

17. An apparatus as in claim 12, wherein the means for transforming includes means for transforming at least some of the wood waste of the identified tree species into the fuel source selected from a group consisting of wood charcoal, methane and combustible materials extractable from the wood waste.

18. An apparatus as in claim 12, wherein the means for transforming includes means for producing a byproduct of tar.

19. An apparatus as in claim 12, wherein the means for transforming includes means for forming powder.

20. An apparatus as in claim 12, further comprising: means for defragmenting stumps of the identified tree species; means for grinding portions of the identified tree species, the steps of defragmenting and grinding being carried out with further tools and equipment, and means for operating at least one of the further tools and equipment with the steam or electricity.

21. An apparatus as in claim 12, further comprising a platform supporting the tools and equipment and being configured to transform the identified tree species into finished wood products, said platform being powered by the steam or electricity.

22. An apparatus as in claim 12, further comprising a compressor powered by the steam or electricity and configured to produce pressurized water from a source of water, an adder of abrasive particles to the pressurized water, a conveyor of the pressurized water with abrasive particles to a site in a manner to effect cutting of the identified tree species.

* * * * *